United States Patent [19]

D'Angelo

[11] 4,061,400
[45] Dec. 6, 1977

[54] SPOKE WHEEL ANTI-THEFT CLIP
[75] Inventor: Robert A. D'Angelo, Ontario, Calif.
[73] Assignee: Keystone Products, Inc., Ontario, Calif.
[21] Appl. No.: 704,153
[22] Filed: July 12, 1976
[51] Int. Cl.[2] .............................................. B60B 7/00
[52] U.S. Cl. ............................ 301/37 AT; 301/37 SS; 151/33; 151/2 R
[58] Field of Search ............ 301/37 R, 37 AT, 37 SS, 301/37 S, 37 SA, 37 H, 108 R, 108 S, 108 SC; 151/33, 41 S, 41, 2 R

[56] References Cited
U.S. PATENT DOCUMENTS 1,033,585  7/1912  Hickey et al. ......................... 151/41
1,070,844  8/1913  Roe ....................................... 151/2 R
2,253,708  8/1941  Holman ............................ 301/108 R
2,727,790  12/1955 Gaylord ............................ 301/37 AT

FOREIGN PATENT DOCUMENTS 728,368  7/1932  France ............................. 301/37 SA Primary Examiner—Stanley H. Tollberg
Assistant Examiner—H. Grant Skaggs
Attorney, Agent, or Firm—Knobbe, Martens, Olson, Hubbard & Bear

[57] ABSTRACT

A device to hinder theft of decorative external wheel accessories. A resilient finger mounted on a holding member engages a projection extending from a bolt or nut to lock the holding bolt or nut in place.

3 Claims, 4 Drawing Figures

SPOKE WHEEL ANTI-THEFT CLIP

BACKGROUND OF THE INVENTION

This invention relates to a locking mechanism for hindering the theft of decorative spokes and similar items placed on wheels.

Decorative spokes are often placed upon the wheels of automobiles and similar vehicles. They are generally held onto the wheel by a simple bolting system which is screwed on over the wheel and hand tightened to hold the spokes in place. Since the wheel is in an open and accessible position when the automobile is parked on a public street, there has been a high theft rate of these items. The thief, in the past, has merely had to firmly grasp the bolt or nut holding the spokes onto the wheel, unscrew the fastening bolt or nut, and make off with the holding bolt or nut and spokes. This has created a great need for a practical locking device for these decorative devices. In addition to preventing theft, it is essential that the locking device, to be commercially practicable, not interfere with the decorative lines of these spoke wheels. Also, since these wheels are largely self-installed, it is desirable for the locking mechanism to be easily installed. The present invention is aimed at providing a maximum hindrance to potential thieves without compromising these other requirements, all in an economical fashion.

SUMMARY OF THE INVENTION

A decorative wheel accessory which is bolted onto the outside of a vehicle, such as an automobile, is provided with a locking mechanism to hinder theft of the holding bolt and accessory. The locking mechanism comprises a base member which fits over the mounting assembly for the accessory and is secured so that it cannot rotate freely with respect to the locking threaded fastener or mounting assembly. Projecting up from this base, a resilient finger extends up and away from the mounting assembly, and then downward so that its tip is accessible beneath the locking threaded fastener. The threaded fastener that holds the accessory in place has formed on its face at least one projection or rib which projects outward from the threaded fastener. The tip of the resilient finger is bent to provide a stub which is pressed to pull the finger toward the mounting base and out of engagement with the projection. The lock operates by pulling the finger down to the base using the stub, and screwing the threaded fastener into its mounting base to hold the accessory in place. The stub is then released, permitting the finger to resiliently rise from the base toward the threaded fastener. The finger projects close enough to the threaded fastener so that turning the fastener will cause the finger to engage the side of the projection or rib on the fastener to prevent further rotation. The lock can be released by using the stub to depress the finger down toward its base, disengaging it from the rib. A screwdriver or similar tool is conveniently used for depressing the stub. The fastener has a cylindrical metal housing projecting from it which holds the accessory in place, and serves to keep the lock substantially hidden from view.

While the invention does not provide a foolproof lock, it will prevent theft by those who are unaware of its existence, or who do not have a tool available to reach and depress the resilient finger. Also, even if the thief is aware of the lock's presence, he will have to spend additional time to steal the accessory and so be discouraged. Thus, both casual and professional thefts will be significantly decreased. The hidden nature of the locking mechanism further prevents it from interfering with the aesthetic effect of the accessory.

DETAILED DESCRIPTION OF A PREFERRED EMBODIMENT

Figure 1:
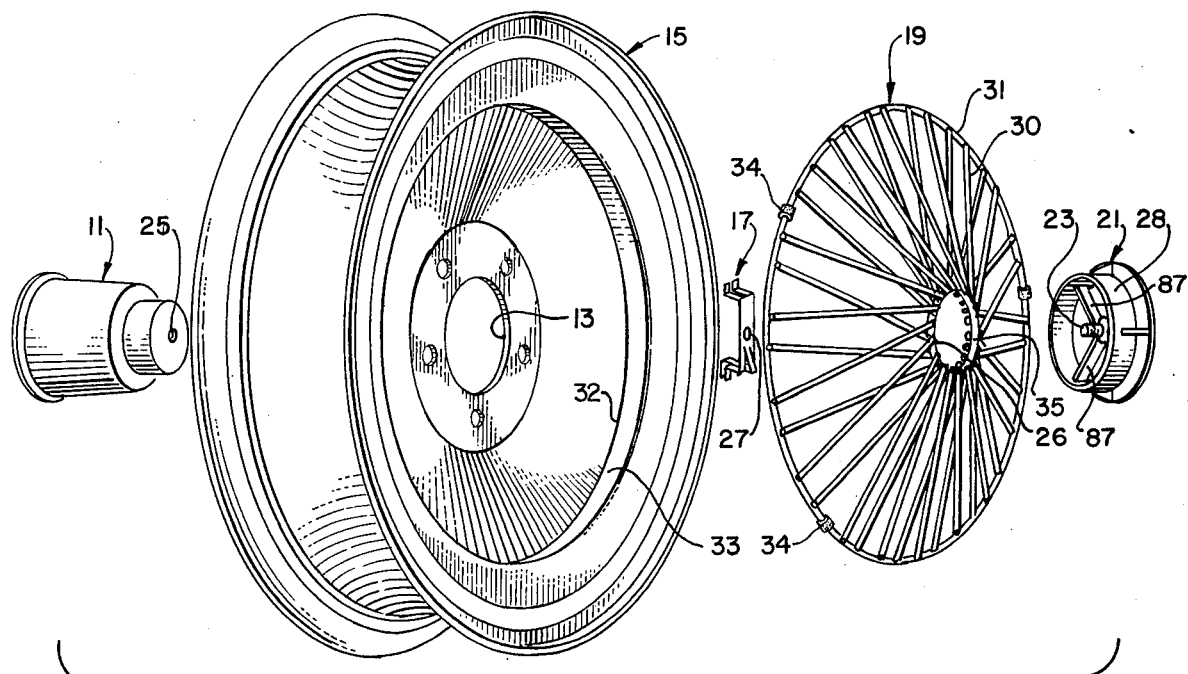
FIG. 1 is an exploded perspective view of the locking mechanism of the present invention combined with an automobile wheel.

Referring to FIG. 1, an exploded view of the instant invention is illustrated. A mounting member 11 is a standard part on spoke wheels of this type, and is typically a pressed fit with a bore 13 at the hub of wheel 15. The mounting member 11, when assembled, provides a cover for the wheel bearing (not shown in FIG. 1) on which the mounting member 11 is placed, thereby improving the aesthetic lines of the wheel, and also providing a central mount for the spoke wheel assembly using the present invention. A locking member 17, formed from spring steel into a shape described below, is attached, in a manner which will also be described below, to a standard spoke assembly 19. After the mounting member 11 is placed through the wheel bore 13, the spoke assembly 19 with the attached locking member 17 is placed against the mounting member 11 and fitted within the rim of the wheel 15, and a threaded fastener, fastening member or fasteneing assembly 21 is attached. The fastening assembly 21 has integrally attached in its center a threaded pin 23. The fastening assembly 21 is attached to the mounting member 11 by threading this pin 23 into a threaded bore 25 at the axis of member 11, after passing the threaded pin 23 through a central opening 26 of the spoke assembly 19 and an aperture 27 at the center of the locking member 17.

It should be evident that the threaded pin 23 could be attached to the mounting member 11 and the assembly 21 could then be threaded as a nut onto a stationary threaded pin.

As the fastening assembly 21, with its asociated threaded pin 23, is threaded into mounting member 11, it advances toward the mounting member 11, the wheel 15, and the spoke assembly 19 with its attached locking member 17. A cylindrical collar 28 of the fastening asembly 21 extends in a direction parallel to pin 23 away from a flat top section 29 of the fastening assembly 21. This wall 28 presses against the spokes 30 of the spoke assembly 19 due to the advance of the fastening assembly 21. The outer rim 31 of the spoke wheel assembly 19 fits tightly within a cylindrical recess 33 of the wheel 15. A plurality of rubber bushings mounted on the outer rim 31 providing means for preventing the spoke assembly 19 from being turned in either direction relative to wheel 15.

Thus, the spoke assembly 19 is clamped between the collar 28 and a corner 32 formed by the termination of cylindrical recess 33. Except for the presence of locking member 17 and a modification due to the present invention to the fastening assembly 21, this method of attaching spoke assemblies has been standard in the art.

Figure 4:
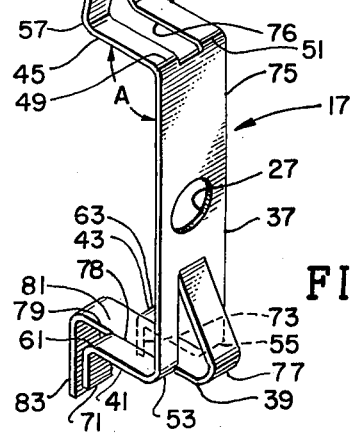
FIG. 4 is a perspective view of the locking member.

Turning now to FIG. 4, the details of the locking member 17 will be described. In the preferred embodiment, the member 17 is made from a piece of resilient spring steel, and comprises two sections, a base 37, and a resilient finger 39. The member 17, in the preferred embodiment, is stamped from a single piece of spring steel. The base section 37 has plural L-shaped legs 41, 43, 45 and 47, each formed by cutting the base 37 from its ends parallel to the length of the base 37, and permanently bending the spring steel at points 49, 51, 53 and 55 and then again at points 57, 59, 61, 63, leaving plural short stubs 67, 69, 71, 73, at the ends of the plural legs 41, 43, 45 and 47, respectively. This produces the L-shaped legs 41, 43, 45, 47 which are almost normal to the central section 75 of member 17, however, they are bent so that the angle A is slightly greater than 90 degrees. The two sets of legs 45 and 47 and legs 41 and 43 each define an open area between them forming the grooves 76 and 78, respectively.

The base section 37 includes the bore 27 dimensioned to allow passage of the threaded pin 23 as was described in connection with FIG. 1. The member 17 also forms the resilient finger 39, which includes a section of the spring steel lying between the legs 41 and 43, bent in a direction opposite to legs 41, 43 to extend above the plane of the section 75. A permanent downward bend 77 forms a downward section 79 which extends past the stubs 71 and 73, to a permanent bend 81 forming a stub section 83.

Figure 3:
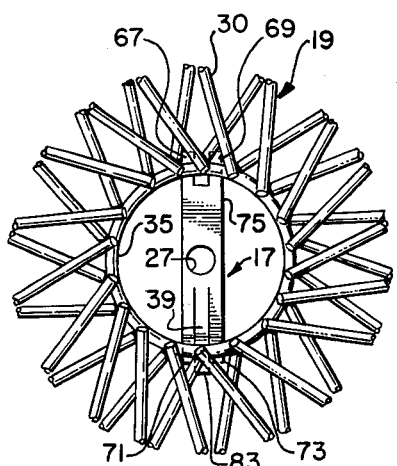
FIG. 3 is an elevation view of the finger base member attached to the spoke member of the wheel of FIG. 1.

Referring now to FIG. 3, the method of attaching the locking member 17 to the spoke assembly 19 is explained. The central section 75 of member 17 is dimensioned so that its length is slightly less than the inner diameter of a circular central rim 35 of asembly 19. However, due to the fact that the L-shaped legs 41, 43, 45 and 47 are not perfectly normal to the central section 75, the distance between the bottom of leg sections 41 and 45 and leg sections 43 and 45 (i.e., at the distance between the bend points 57 and 61, and bend points 59 and 63) is slightly greater than the diameter of inner rim 35. The member 17 is pushed through the cental rim 35, causing the leg sections 41, 43 and 45 and 47 to deflect and resiliently engage the rim 35. The forward motion of member 17 is stopped when stubs 67, 69, 71 and 73 contact the central rim 35.

Each of the stubs 67, 69, 71, 73 fits between a pair of spokes of assembly 19 and against the central rim 35 to prohibit rotation of the locking member 17 relative to spoke assembly 19.

Figure 2:
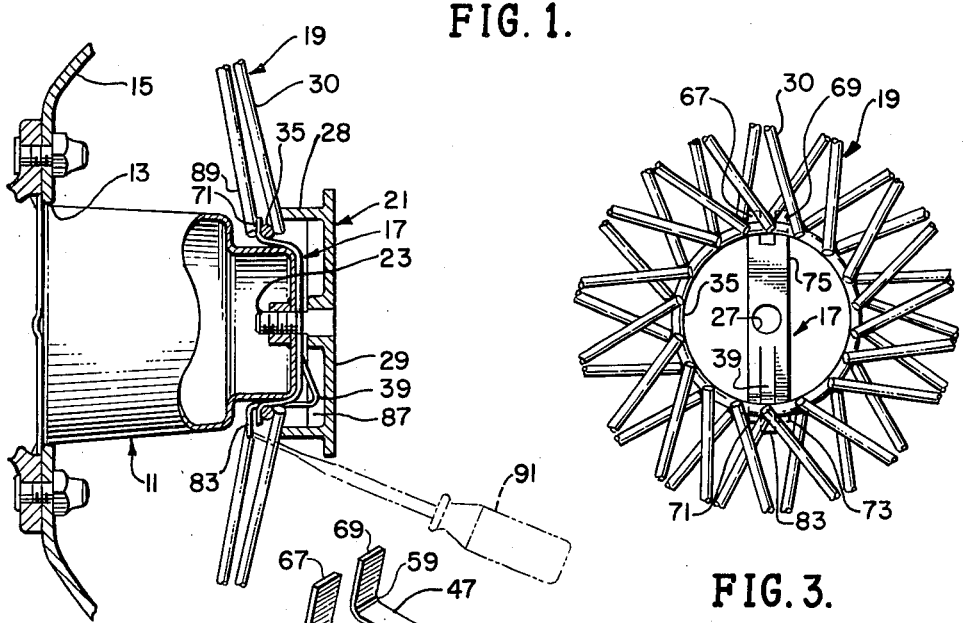
FIG. 2 is a sectional view through the center of the locking mechanism of FIG. 1 mounted on an automobile wheel in the lock position.

Referring now to FIG. 2, the full assembly of the instant invention on a wheel and its locking capabilities can be explained and understood. The mounting base 11 projects in a fixed position through bore 13 in the wheel 15. The locking mechanism 17 is attached to the spoke assembly 19 in a manner described above and as illustrated in FIG. 3, and these members are placed over the small end of base 11.

The fastening member 21 has one or more projections 87 extending from its top section 29 toward the mounting member 11. In the preferred embodiment, these projections are substantial ribs extending from the top section 29 between the pin 23 and the cylindrical wall 28. When the fastening member is threaded into the mounting base 11, the stub 83 must be pressed toward the wheel 15, as with screwdriver 91 lowering the resilient finger 39 toward its base 75 so that it will not engage the ribs 87. After the fastening assembly 21 has been threaded so that the spoke assembly 19 is held tightly in place, the stub 83 is released. This will allow the resilient finger 39 to rise to its relaxed rest position, where it can engage the projection or rib 87 to prevent the rotation of fastening member 21.

Upon full assembly, the cylindrical wall 28 of the fastening assembly 21 engages the assembly 19, and its ribs 87 project close enough to the locking member 17 that the projection or rib 87 will engage a side of the bend 77 at the end of the upwardly extending resilient finger 39. This engagement of the finger 39 by a rib 87 will arrest any attempt to rotate the fastening assembly 21. The locking member 17 itself will not rotate because each pair of stubs 67, 69, 71 and 73 straddles a spoke 30 of assembly 19. In FIG. 2 this is illustrated by the stub 71 engaging the side of the spoke 89. The rib 87 is of sufficient thickness and strength, and firmly enough attached to the fastening assembly 21, that it will not break despite vigorously twisting the assembly 21 to apply considerable pressure to the finger 39. Similarly, the materials that compose the member 17 are sufficiently stiff and durable to avoid being easily bent or broken.

It should be evident that the height the resilient finger 39 rises above the section 75, the distance the rib 87 projects down from the section 29 of the fastening assembly 21, and the length of the cylindrical wall 28 are mutually dependent to accomplish the foregoing cooperation whereby the finger 39 can solidly engage the projecting rib 87 when the wall 28 engages the spoke assembly 19.

The fastening assembly 21 is released from engagement with the resilient finger 39 by taking a convenient tool, such as the screwdriver 91, and pressing on the stub 83 of the finger 39. The downward leg 79 of the finger 39 is dimensioned so that stub 83 is conveniently located to be easily accessible but not in obvious view. To unscrew the assembly 21, the stub 83 is depressed until the projecting rib 87 clears the resilient finger 39.

What is claimed is:

1. Apparatus for preventing theft of a spoke assembly from a wheel, comprising:
    a spoke assembly including plural radiating spokes and means preventing relative rotation between said spoke assembly and said wheel;
    a locking member attached to said spoke assembly to prevent rotation of said locking member relative said spoke assembly;
    said locking member being unitarily formed of resilient metal and comprising a base, a resilient finger extending from said base, said finger being an integral part of said locking member, and an extending section of said finger ending in a stub which may be depressed to lower said finger towards its base; and
    a threaded fastener clamping said spoke assembly to said wheel, said threaded fastener including a projection selectively engaging said finger when said finger is in its relaxed position, said projection spaced sufficiently from said locking member to not engage said finger when said finger is resiliently bent toward said base.

2. Apparatus for preventing theft of a spoke assembly from a wheel comprising:
    a spoke and means preventing relative rotation between said spoke assembly and said wheel assembly including plural radiating spokes;

a locking member attached to said spoke assembly to prevent rotation of said locking member relative said spoke assembly;

said locking member comprising a base, a resilient finger extending from said base and means on said finger for depressing said finger to resiliently bend said finger towards said base;

said locking member comprising a plurality of legs, said legs bent to form stubs at their ends, said stubs engaging said spokes to prevent a relative rotation of said locking member and said spoke assembly; and a threaded fastener clamping said spoke assembly to said wheel, said threaded fastener including a projection selectively engaging said finger when said finger is in its relaxed position, said projection spaced sufficiently from said locking member to not engage said finger when said finger is resiliently bent towards said base.

3. A locking mechanism for a wheel cover of a wheel comprising:

a spoke assembly, said assembly including an inner and outer rim to which plural spokes attach and further including means preventing relative rotation between said spoke assembly and said wheel;

a locking mechanism, said mechanism made unitarily of resilient material, said mechanism including a base section, said base section having plural legs extending from one side of said base section, said plural legs bent at their ends forming stubs, said legs, at said bends, resiliently engaging and pressing against said inner rim, said stubs on said legs extending outward from said rim to engage the spokes of said assembly, preventing rotation by the base member upon application of a torque to said base member, said locking mechanism including a resilient finger comprising a first section lying substantially on said one side of said base member, and a second section lying substantially on the other side of said base member, said first section of said finger including a stub which, when depressed, draws said second section of said finger towards said base; and a threaded fastener engaging said wheel and overlying said locking mechanism, said fastener including a collar for engaging the spokes of said spoke assembly, whereby said spoke assembly is held in place on said wheel, said fastener including a projection within said collar, said projection extending sufficiently far from said fastener to engage said resilient finger when said collar is engaged on said spoke assembly, and said projection formed to provide sufficient space between it and said finger base section to allow said finger, upon being depressed, to disengage from said projection.

* * * * *

UNITED STATES PATENT AND TRADEMARK OFFICE
CERTIFICATE OF CORRECTION

PATENT NO. : 4,061,400
DATED : December 6, 1977
INVENTOR(S) : Robert A. D'Angelo It is certified that error appears in the above-identified patent and that said Letters Patent are hereby corrected as shown below:

In Column 4, lines 66, 67, and 68, delete "and means preventing relative rotation between said spoke assembly and said wheel assembly including plural radiating spokes" and insert --assembly including plural radiating spokes and means preventing relative rotation between said spoke assembly and said wheel--.

Signed and Sealed this

Twenty-fifth Day of April 1978

[SEAL]

Attest:

RUTH C. MASON
Attesting Officer

LUTRELLE F. PARKER
Acting Commissioner of Patents and Trademarks